United States Patent [19]

Collins

[11] Patent Number: 4,621,113
[45] Date of Patent: Nov. 4, 1986

[54] REPEATING BLOCK, OLIGOMER-FREE, POLYPHASE, THERMOFORMABLE POLYURETHANES AND METHOD OF PREPARATION THEREOF

[75] Inventor: Guy R. Collins, Walnut Creek, Calif.

[73] Assignee: The Dow Chemical Company, Midland, Mich.

[21] Appl. No.: 785,294

[22] Filed: Oct. 7, 1985

[51] Int. Cl.$^4$ ............................................. C08G 18/10
[52] U.S. Cl. .................................... 524/196; 252/182; 528/67; 528/76
[58] Field of Search .................... 524/196; 528/67, 76; 252/182

[56] References Cited

U.S. PATENT DOCUMENTS

| | | | |
|---|---|---|---|
| Re. 31,671 | 9/1984 | Bonk et al. | 528/65 |
| 3,562,352 | 2/1971 | Nyilas | 260/824 |
| 4,062,834 | 12/1977 | Gilding et al. | 260/77.5 |
| 4,312,973 | 1/1982 | Critchfield | 528/77 |
| 4,385,133 | 5/1983 | Alberino et al. | 528/77 |
| 4,447,590 | 5/1984 | Szycher | 528/76 |
| 4,460,365 | 7/1984 | Ganshirt et al. | 604/408 |
| 4,463,156 | 7/1984 | McGary et al. | 528/65 |
| 4,465,480 | 8/1984 | Tanaka et al. | 604/264 |
| 4,469,657 | 9/1984 | Dominguez | 264/328.6 |
| 4,485,227 | 11/1984 | Fox | 528/61 |
| 4,524,036 | 6/1985 | Gilding et al. | 264/10 |
| 4,532,316 | 7/1985 | Henn | 528/60 |

FOREIGN PATENT DOCUMENTS 3318730 11/1984 Fed. Rep. of Germany .

OTHER PUBLICATIONS

*Polymer Science & Technology*, vol. 8, 1975, pp. 45–75.
Boretos et al., *Science*, vol. 158, 1967, pp. 1481–1482.

*Primary Examiner*—Maurice J. Welsh
*Attorney, Agent, or Firm*—Robert R. Stringham

[57] ABSTRACT

Polyphase, transparent, polyblock, oligomer-free, segmented urethane polymers having molecular weights of from about 100,000 to about 200,000 and being eminently suited for use in medical devices such as blood bags, etc., are derivable from chain extenders, free diisocyanate molecules and prepolymers consisting essentially of linear molecules which are terminated at each end by isocyanate groups. The prepolymer molecules consist of n branched, polyether glycol residues joined through intervening carbamate groups with (n+1) diisocyanate residues, n ranging from about 1 to 4 and having an average value of less than 2. The polyether glycols have molecular weights of from about 1000 to about 6000 and are methylol-terminated chains of $C_3$-$C_6$ alkylene oxide units. Importantly, the final polymers are free of domain crystallinity.

60 Claims, No Drawings

REPEATING BLOCK, OLIGOMER-FREE, POLYPHASE, THERMOFORMABLE POLYURETHANES AND METHOD OF PREPARATION THEREOF

FIELD OF INVENTION

The polymers of the invention have utilities common to most polyurethanes but are particularly useful as bio- and hemocompatible materials for the fabrication of prosthetic and biomedical devices. The latter technology is reviewed in *Kirk-Othmer, Encyclopedia of Chemical Technology*, 3d. Ed., Vol. 19, pp. 275–313 (1982). See also: *Necessary Considerations for Selecting a Polymeric Material for Implantation* (etc.). G. L. Wilkes; *Polymer Science & Technology*, Vol. 8, pp. 45–75 (1975).

BACKGROUND

A variety of synthetic resinous materials have been used or proposed to be used for the fabrication of articles to be employed in contact with blood and/or other body fluids. However, the only material fully accepted in the United States at the present time for use in blood tubing and blood bags is polyvinyl chloride (PVC) plasticized with dioctyl phthallate (DOP)—also known as di-2-ethylhexyl phthallate (DEHP). Even the plasticized PVC leaves something to be desired. That is, leaching of the DOP by blood occurs, with the result that DOP accumulates in the body tissues and vital organs of patients repeatedly subjected to treatments such as blood dialysis. Clinical testing of a PVC plasticized with a different ester—trioctyl mellitate—was FDA-approved but has been at least temporarily discontinued. An olefin terpolymer material has also received approval for clinical testing but remains to be proven out.

Several types of polyurethanes have been proposed as bio and hemocompatible materials. U.S. Pat. No. 4,062,834 (1977) teaches the suitability for use as blood bags of certain melt-extrudable, thermoplastic, polytetramethylene ether polyurethane-urea elastomers (having Shore A hardness values of 70–87). These polymers are made by preparing a pre-polymer (having an isocyanate index of 1.3/1 to 1.7/1) from a tetramethylene ether glycol and 4,4'-diphenyl methane diisocyanate and then extending it with water. However, it is now known that aryl urethanes tend to produce carcinogenic aromatic amines when subjected to conditions favorable to hydrolysis, such as those prevailing during steam sterilization.

U.S. Pat. No. 4,447,590 (May 1984) discloses, as suitable blood bag materials, certain extrudable polyurethanes prepared, by a "one-shot" process, from tetramethylene glycol, aliphatic diisocyanates and 1,4-butane diol (as a chain extender). The patent teaches that polytetramethylene glycol is the only polyol found to produce a polyurethane which not only has the requisite hemocompatibility but also has other properties—such as hydrolytic stability and non-toxicity—required for candidate blood bag materials.

U.S. Pat. No. 4,460,365 (July 1984) teaches that, to be suitable for use as blood bags, polyurethanes must have Shore A hardness values of about 60–85 and that whether or not a polyurethane meeting this requirement is otherwise suitable for blood bag use can be determined by known test methods. The chemical composition of the only specific polyurethane purported to meet blood bag requirements is not given.

U.S. Pat. No. 4,465,480 is directed to segmented, polyether urethane ureas of reduced thrombogenicity. These urethanes are made by using aliphatic or cycloaliphatic diamines to extend urethane prepolymers made from polyoxyalkylene diols and diisocyanates—such as 4,4'-diphenylmethane diisocyanate, for example. They are said to avoid the generation of aromatic amines consequent upon using water as a chain extender (as in the +590 patent discussed above). However, this of course would not ensure non-hydrolysis during steam sterilization. The disclosure in the patent suggests strongly that the subject polymers must be prepared and processed as solutions in solvents such as dimethyl formamide, i.e., are not extrudable.

The latter patents are believed to constitute the nearest prior art to the present invention. It does not appear that any of the dissolved polymers—or any polymer that could reasonably be contended to be suggested by these patents—meets the following requirements to the extent desirable for a second generation blood bag/blood tubing material.

To be suitable as a replacement for PVC/DOP, a candidate material should at least: have mechanical and biocompatibility properties comparable to those of PVC, be non-toxic, be not substantially more expensive than PVC, contain nothing which will be leached out by blood (or is not known to be innocuous), be capable of being tightly bonded at joints and connections, retain its mechanical integrity and performance at body temperatures (about 38° C.), not fail in mechanical handling, be hydrolytically stable at steam sterilization temperatures and not be prone to kinking. Desirably, such a material is both soft and tough, is transparent, has a relatively high permeability to $O_2$ and $CO_2$, retains its room temperature mechanical properties after being chilled to low temperatures, can be thermoformed without decomposing or becoming thermoset, has an acceptable "feel" to those people (nurses, for example) who must handle the material frequently and affords a longer "shelf life" container for stored blood or blood components. The difficulty of finding a material—polyurethane or otherwise—which can largely satisfy the foregoing requirements should be apparent.

OBJECTS OF THE INVENTION

The primary object of the present invention is to provide a suitable replacement for PVC/DOP as the material used to fabricate blood bags, transfusion or dialysis tubing and similar articles.

A corollary object is to provide a material suitable for use in the form of prostheses and other medical devices which will be in contact with body tissues, blood or other body fluids.

Another object is to provide a controlled but flexible process for reproducibly making a polyurethane meeting any of a number of sets of specifications, according to contemplated end use.

A particular object is to provide polyurethanes otherwise suitable for use in medical devices but having narrower molecular weight ranges than conventional medical polyurethanes. A most particular object to the latter end is avoidance of the presence of low molecular weight species in the prepolymer from which the final polyurethane is prepared. Inclusion of oligomers in the final polymers may be responsible for bio-compatibility problems experienced in prolonged contact of tissues or body fluids with conventional polyurethanes.

An additional object is to provide a polyurethane which is unique as such and has utility in non-medical, as well as medical, applications.

Still other objects will be made apparent to those knowledgeable in the art by the following specifications and claims.

SUMMARY OF THE INVENTION

It has been found that the foregoing objects can be attained by preparing a urethane prepolymer of controlled chain length from a predominantly methylolterminated, branched, polyether glycol and a non-aromatic diisocyanate and then reacting the isocyanato-terminated prepolymer with a chain extender and free diisocyanate to form a final, polyphase, polyblock, oligomer-free, urethane polymer, which is essentially free of domain crystallinity.

The prepolymer and final polymer compositions of the present invention may be defined as follows:

The prepolymer compositon comprises a urethane prepolymer which:

(1) consists essentially of generally linear molecules terminated at each end by an isocyanate group and consisting of n branched, polyether glycol residues joined, through intervening carbamate groups, with (n+1) diisocyanate residues, n ranging from about 1 to 4, preferably about 2-4, and having an average value of from about 1.5 to about 1.7, and (2) can be prepared by
  (a) providing one molecular proportion of a methylol-terminated polyether glycol, optionally in admixture with an amount of a catalyst insufficient to cause gelling if the prepolymer composition-to-be is later mixed with a chain extender,
  (b) while stirring said glycol or glycol/catalyst mixture and heating as may be necessary to drive the reaction, incrementally adding to it at least two molecular proportions of a non-aromatic diisocyanate, and
  (c) allowing the reaction to proceed until the content of isocyanate has dropped by an amount corresponding to complete conversion of the glycol, said glycol having a molecular weight of from about 1000 to about 6000 and consisting essentially of chains of —O—CRR'—CH$_2$— units in which each of R and R' is H, methyl or ethyl, independently, except that in at least a preponderance of said units one or the other of R and R' is not H.

The final polymer composition comprises a repeating block, oligomer-free, polyphase, thermoformable, segmented polyurethane which is free of domain crystallinity, has a weight average molecular weight of from about 100,000 to 200,000 or more and consists essentially of alternating soft and hard segments. Advantageously, the molecular weight is within the range of from about 100,000 to about 180,000. The range of from about 130,000 to about 180,000 is preferred and the range of from about 145,000 to about 155,000 is particularly preferred.

The polymer is preparable from the foregoing prepolymer composition by:

(i) adding to the prepolymer composition such additional amount of a diisocyanate as may be required to provide a total of up to about 10 molecular proportions of free and converted diisocyanate per molecular proportion of said polyether glycol, with the proviso that the free diisocyanate present when the following step (ii) is initiated is of a nature such that the final polymer will be essentially free of domain crystallinity, (ii) mixing with the prepolymer composition, separately or in admixture with any diisocyanate added in (i), a chain extender which is a short chain, non-flexibilizing compound having from 2 to 4 isocyanate-reactive functional groups, the amount of said chain extender being such that the isocyanate index for the resulting mixture is from about 1.025 to about 1.035, and (iii) adding a catalyst and allowing said isocyanate-terminated prepolymer, the free diisocyanate and said chain extender to react, thereby forming said final polymer, said soft segments being contributed to said final polymer by said prepolymer and said hard segments being formed by the interaction of the chain extender with isocyanate terminations of the prepolymer and with free diisocyanate molecules.

Definitions of Terms

The meanings intended herein for certain of the terms employed in the preceding definitions are as follows:

"Preparable" means "can be prepared" and is not to be taken as synonymous with "has been prepared". (Similarly, "derivable" is not to be equated with "derived".)

"Methylol-terminated" means that about 95% or more of the glycol end moieties contain unhindered methylol groups, i.e., terminate in primary hydroxyls; the remainder of the end groups are at least predominantly terminated by secondary alcoholic hydroxyls, i.e., are derived from propylene (or higher) oxide units which have not been capped by ethylene oxide (or otherwise linked to methylol groups).

"Catalyst"—a catalyst for the adduction of isocyanate groups with active hydrogen compounds.

"Chain of —OCRR'—CH$_2$—units" includes such chains interrupted by the residue of an initiator compound in which at least two active hydrogens were present.

"Non-aromatic diisocyanate" means an aliphatic or cycloaliphatic diisocyanate which may include aromatic or heteroaromatic rings but in which no reactive isocyanate groups are attached to those rings.

"Domain Crystallinity"—the hard and soft segment domains result from interactions between like segments, as discussed in more detail subsequently herein. Crystallinity of hard segment domains is conventionally considered essential to the strength and elasticity of segmented polyurethanes.

A "diisocyanate of such a nature that the resultant polymer will be free of domain crystallinity" is a plurality of diisocyanate molecules which form hard segments, incapable—for whatever reason—of interacting with each other strongly enough to result in domain crystallinity. This is discussed further subsequently herein.

"Isocyanate index" means the ratio of isocyanate and isocyanate-derived groups in the mixture to the total of isocyanate reactive groups—including secondary hydroxyls—which were present in the glycol and are present in the chain extender.

"Short-chain, non-flexibilizing" means having a linear backbone which includes no flexibilizing links and has a length ranging from as short as a (—CH$_2$—)$_2$ group to as long as p,p'-diphenylbenzene.

In order to have the character essential to the practise of the present invention, the prepolymer must consist at least predominantly of the molecules specified in clause (1) in the foregoing definition. Other reaction products in which one or both ends of the molecule are not isocyanate terminated and/or which include more than about 4 polyether glycol residues are less desirable but can be tolerated in minor proportions and are generally unavoidable—particularly so since preparation by known methods of "methylol-terminated polyglycols" which do not include minor amounts of species terminated at one or both ends by secondary hydroxyls would be quite expensive.

"Isocyanate Reactive" means capable of reacting with isocyanate groups to form stable links between the diisocyanate and chain extender.

"Polyphase" means that the soft and hard segments in the final polymer are microscopically "incompatible", i.e., that microphase separation or domain formation occurs within the polymer. This is true even though the final product is transparent and no other indications of phasing are visually apparent. Neither phase is crystalline.

"Polyurethane" requires the presence of urethane (carbamate) links but does not exclude the presence of urea links.

The process of the present invention is well summarized in the preceding composition definitions.

Preferred catalysts are those which, as residues, are innocuous to body fluids and tissues in articles formed of the final polymers of the present invention.

The urethane polymers of the present invention are

The molecular weight of the glycol should be within the range of from about 1000 to about 6000, including the methylol-containing end groups. This is with the proviso that intolerable amounts of chain-terminating, monohydroxy polyether molecules having a vinyl-reactive end group (as a result of water loss following "abnormal" —C—OH/oxirane reaction) are not present with the polyether glycol molecules.

Preferably, the weight ratio of ethylene oxide units to branched alkylene oxide units in the glycol is as low as possible—so long as the requirement for methylol termination is met. As a practical matter, however, copolymers resulting from EO capping of a polypropylene glycol (for example) which comprise less than a few wt. % of EO units would be costly to prepare. EO capped polypropylene glycols which contain more than about 20 wt. % of EO units are not considered very desirable for the practise of the present invention. Thus, the range of from about 5/95 to 20/80 for the weight ratio of EO to branched alkylene oxide units is presently considered the most practical. (It may be noted that 5% EO corresponds to a total of about seven EO units in a 6000 molecular weight polyglycol consisting of a polypropylene glycol capped with ethylene oxide.)

It is essential to preparation of the urethane prepolymer by the method of the invention that the glycol be terminated by groups containing hydrogens having the reactivity with isocyanate groups of the hydrogens in primary alcoholic hydroxyls and yielding stable adduct groups. This requirement is most readily met by unhindered —CH$_2$OH groups, at both ends of at least a high proportion of the glycol molecules employed. The radical (—Q—) intervening between the methylol groups and the polyether chain, i.e. in

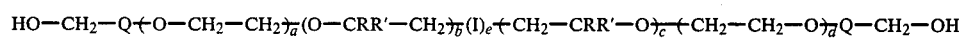

not thermosets but are cured in the sense that the liquid mixture of prepolymer, unconverted diisocyanate, chain extender and catalyst can be converted to a shaped, solid body by heating in a mold (or by RIM-reaction injection molding). Thus, the "cure" rate of the mixture is essentially the rate of formation of the final polymer (and may be judged by measuring the inherent viscosity of the mixture after progressively longer intervals of time at 150° C.).

DETAILED DESCRIPTION

Suitable Glycols, Diisocyanates, Chain Extenders, Catalysts, Etc., for the Practise of the Invention

Glycols

For the purposes of the present invention, it is essential that the glycol employed be branched i.e., predominantly derivable from C$_3$-C$_6$ alkylene oxides, preferably propylene and/or butylene oxide. Some ethylene oxide-derivable units may be included in the polyether chain, so long as the essential effect of branched units on the character of the pre- and final polymers is retained and phase crystallization does not result. As indicated above, the polyether chains may be interrupted by residues of polyfunctional, active hydrogen compounds which were employed to initiate the chains. A variety of such initiators are well known; their residues constitute only a very small segment of a polyglycol molecule and the present invention is not predicated on the choice of such initiators. Accordingly, no necessity for listing specific initiators is seen.

for example, preferably is —CH$_2$ in at least 95% of the polyglycol molecules. (Q may be the same or different in each occurence, I is the residue of an initiator, e is zero or 1 and a, b, c and d are integers such that the average molecular weight of the polyglycol is from about 1000 to about 6000 and the weight ratio of —O—CH$_2$—CH$_2$ units to —O—CRR'—CH$_2$ units (as defined earlier herein) is not greater than about 20/80.).

Illustrative of other suitable Q moieties are branched or linear C$_2$-C$_7$ alkylene groups and C$_6$-C$_{10}$ alkylcycloalkylene groups.

The corresponding HO—CH$_2$—Q— groups may be attached to conventional polyether glycols—such as polyproplyene glycol, for example—by reaction of the di-sodium salt of the glycol with bromoalkanols, such as—for example—HO-(-CH$_2$-)$_3$ Br (known), HO-(-CH$_2$-)$_4$Br (preparable by the ring-opening addition of HBr to tetrahydrofuran) and bromoalkanols derivable by way of the Hunsdiecker reaction of bromine with silver salts of methylol-containing carboxy acids. Alternatively, the bromoalkanol may be prepared from the corresponding bromine-substituted carboxylic acid, as such or as the acyl chloride or methyl ester, by reduction with the combination of LiAlH$_4$ and AlCl$_3$ (see page 16 of *REDUCTIONS*, Augustine; Marcel Dekker Inc., N.Y. (1968)). Known bromocyloaliphatic acids believed amenable to this reduction are 2-bromocyclopropane carboxylic acid, 2-bromocyclopentane carboxylic acid and 4-bromocyclohexane carboxylic acid. The resulting bromoalcohols can be represented generally as Br—Δ—CH$_2$OH, where —Δ— represents a cycloalkyl ring of from 3 to 7 (or more) carbons.

Q of course can include non-interfering substituents but should be relatively rigid and of relatively low molecular weight. The methylol-terminated glycol should not include groups—such as unsaturated or ester groups, for example—which are readily oxidized or hydrolyzed under the conditions of use contemplated for the final polymer.

Commercial EO-capped polyether glycols of course are generally not composed of only single types of molecules. Capping of polypropylene glycols, for example, with ethylene oxide generally achieves the desired result of introducing methylol-terminated groups, but at the "expense" of introducing polyethylene oxide segments as well; neither are all secondary alcoholic hydroxyls necessarily capped with EO, i.e., up to about 5% of the alcoholic hydroxyls present in the polyglycol may be unconverted secondary hydroxyls. Also, some polypropylene oxide segments may be separated by intervening polyethylene oxide segments. Further, some free glycol molecules composed predominantly or entirely of polyethylene oxide units may be formed. It has been found that, as a general rule, the presence of even a few percent of species comprising more than about 7 ethylene oxide units per segment in the macrodiol component is undesirable. That is, the resulting crystallization tendencies may adversely effect both optical and mechanical properties of the final urethane polymer.

Diisocyanates

Diisocyanates suitable for the practise of the present invention are those which include no reactive isocyanate groups attached directly to aromatic or heteroaromatic rings, no interfering substituents and no backbone segments which will readily undergo oxidation or hydrolysis in use of the final polymer. Preferably, the diisocyanates comprise no aromatic moieties and consist only of aliphatic and/or cycloaliphatic moieties. For preparation of medical polymers, the absence of sulfur-comprising groups in the diisocyanate (and other components) is highly preferred.

Specific diisocyanates illustrative of the above type are polymethylene diisocyanates, 1,4-bis(isocyanatomethyl)-cyclohexane, cyclohexane-1,4-diisocyanate, 2,2,4-trimethyl-hexamethylene diisocyanate, hexahydrotoluene diisocyanate, di(isocyantoethyl)carbonate, lysine diisocyanate, furfurylidene diisocyanate, isophorone diisocyanate, 1,4-bis(2-isocyanatoisopropyl) benzene, bis-[4(2-isocyantoisopropyl)phenyl]carbonate and 1,8-diisocyanato-p-menthane (preparable by the reaction of the corresponding diamine with phosgene).

Representative of another type of diisocyanates considered suitable in prepolymer formation and/or prepolymer conversion to the final polymer are those deriveable from the reaction of a low molecular weight diol, diamine, hydroxy amine, etc. —(HO—X—OH), for example—with at least a several fold excess of a diisocyanate (OCN—Y—NCO) and having the following di-adduct formula (for example)

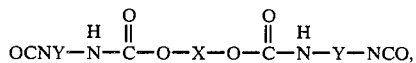

wherein Y is such that the diisocyanate is one of the foregoing general type and X is either flexible (preferably when incorporated in the soft, prepolymer segments) or stiff (preferably when incorporated in the hard segments added in forming the final polymer). It will be recognized that when X is stiff the low molecular weight difunctional compound may be the same as the chain extender (see following discussion). Separation of the diadduct from the unconverted diisocyanate is not necessary and generally will not be desirable. That is, the adduct is most conveniently, and preferably, employed in admixture with the excess diisocyanate.

If desired, a mixture of the latter type in which the mole fraction of the diadduct is small may be employed as the diisocyanate added to the polyether glycol in the initial stage of prepolymer preparation, even when X is stiff. This should result in the inclusion of one to a few hard links within some of the otherwise soft segments, thereby affording a way to controllably moderate the softness of the soft segments of the prepolymer.

Where maximum flexibility of the soft segments is desired, more flexible diisocyanates—such as, for example, hexamethylene diisocyanate—will be preferable as the diisocyanate in the prepolymer molecules. Similarly, less flexible diisocyanates—such as, for example, isophorone diisocyanate—will be preferable as the diisocyanate in the hard segments when maximum rigidity is desired therein. However, it is also important for the solubility parameter of the diisocyanate-derived links between the prepolymer and chain extender moieties to differ sufficiently from the solubility parameter of the polyether glycol-derived chain of —O—CR-R$^1$—CH$_2$— units to contribute to the requisite incompatibility between the soft and hard segments in the final polymer.

The diisocyanate used at any stage of preparation of the pre- and/or final polymer may be introduced in the form of the corresponding di(nitrile carbonates)—such as, for example, adiponitrile dicarbonate.

Finally, the free diisocyanate present in the prepolymer/chain extender/diisocyanate mixture to be converted to the final polymer must be of a nature such that the hard segment domains to be formed will be noncrystalline.

Chain Extenders

Types of short chain, non-flexibilizing compounds illustrative of those suitable for use as chain extenders in the practise of the present invention include the following: aliphatic, C$_2$-C$_4$ straight and branched chain diols, diamines and hydroxyamines; hydrazine and piperazine; cyclo-and dicycloaliphatic diols, diamines or hydroxy amines having up to 12 carbons, hydroquinone and resorcinol—as such or as the bis-(2-hydroxyethyl)ethers; and aromatic and heteromatic nuclei—as such or hydrogenated, and substituted with two group which are methylol and/or aminomethyl.

C$_2$-C$_4$ diols are preferred, particularly ethylene glycol.

Higher functionality hydroxy and/or amino compounds considered suitable are exemplified by pentaerythritol, trimethylol propane and N(-2-hydroxypropyl)ethylenediamine.

Other suitable types of chain extenders are fluorine-substituted, difunctional active hydrogen compounds such as—for example—1,2,3,3,4,4-hexafluoropentane-1,5-diol, and phenyl substituted C$_2$-C$_5$ diols—preferably 2-phenyl-1,3 propylene glycol or -1,4-butylene glycol.

Catalysts

Final polymers of the invention which are not contemplated for use in medical applications may be made with any otherwise suitable catalyst for isocyanate/active hydrogen compound reactions. Many such catalysts are well known and need not be listed here. However, when the final polymer is to be used in medical applications, it will be necessary to use a catalyst which, in the amount required to effectively catalyze the reaction, will be innocuous as a residue in the polymer. This requirement can be met by using catalysts which are tin salts, in amounts such that the FDA limit of 40 ppm of tin is not exceeded. Exemplary of suitable such catalysts are stannous octoate, stannous oleate, dibutyl tin dioctoate and dimethyl or dibutyl tin dilaurate. Another type of tin salt, less preferred by reason of its sulfur content but believed acceptable in catalytic amounts, is FOMREZ UL-29— a stannic diester of a thiol acid (exact composition not published) sold by Witco Chemical Company.

Although not indispensable, catalysis of prepolymer formation is highly desirable. It is possible to prepare excellent quality prepolymer in the absence of a catalyst. However, much longer reaction times are required and the complete conversion of any secondary hydroxyls in the polyglycol may not be attained; these hydroxyls will react during final polymer formation (in which a catalyst is used) and may adversely effect the balance of final polymer properties by increasing compatibility of the soft and hard segments. The use of a catalyst in prepolymer preparation results in rapid and complete reaction and is believed essential to economic practise of the present invention on a commercial scale.

The amount of catalyst used in making the prepolymer is limited. That is, if too much catalyst is used, reaction of the prepolymer with the chain extender will be so rapid that gel formation will result when mixing of the prepolymer/isocyanate mixture and the chain extender is attempted. (Once admixture is achieved, more catalyst can be added).

When a tin catalyst of the above discussed type is employed at an overall level of about 0.02 wt. % of the final polymer composition, gelation usually results if more than 10 wt. % of the latter amount of catalyst is used in making the prepolymer.

Stabilizers

The prepolymers of the invention do not have to be formed in the presence of a stabilizer. Nevertheless, if they are to be subjected, as in storage or shipping, to elevated temperatures, radiation or atmospheres of elevated oxidant content, stirring-in of a stabilizer in the last stage of prepolymer formation is advisable. Otherwise, the addition of a stabilizer can be delayed, even until after pelletization of the final polymer. However, a stabilizer must be added prior to prolonged processing or treatment at elevated temperatures or irradiation, at any stage. Exemplary of a suitable type of stabilizer are IRGANOX 1010 (tetrakis [methylene(3,5-di-t-butyl-4 hydroxycinnamate)]methane, IRGANOX 1076 octadecyl-3,5-di-tertbutyl-4-hydroxy-hydrocinnamate and IRGAFOS 168; tris(2,4-di-t-butyl)phosphite (all are trademarks of Ciba-geigy Co.).

Effects of Structural and Process Parameters on Polymer Properties

The various compositional, structural and processing factors which effect the biological and physical properties of segmented polyurethanes are well known (see the references cited in the background discussion herein; also, *Prosthetic and Medical Devices; Kirk-Othmer*, loc. cit, Vol. 19. pp. 275–313, 1982.). The discussions of these effects in the foregoing references are generally applicable to the polymers of the present invention. See also, Wong, Frisch et al., *Structure-Property Relationships of Transparent Cycloaliphatic Polyurethane Elastomers*, 186th. National ACS Meeting (Proceedings), Washington, D.C. (1983).

The disclosures of all of the references cited in these specifications are hereby incorporated herein by reference for all such purposes as may be legally served thereby.

In forming the prepolymer, reactant ratio and the manner and rate of combination of the reactants are the main factors that control the range and average value of n. The average molecular weight of the prepolymer depends on both n and the molecular weights of the reactants; the polyether glycol (macroglycol) predominantly. The molecular weight of the glycol can range from about 1000 to about 6000, n should range from 1 to about 4 and should have an average value of less than 2.

Thus, the weight of the prepolymer molecules (the soft segments in the final polymer) can range from about $1 \times 1000$ (plus twice the molecular weight of the diisocyanate) to about $4 \times 6000$ (plus five times the molecular weight of the diisocyanate); i.e., from about 1000 to about 25,000. An average molecular weight of from about 2,000 to about 8,000 is preferred.

The average value of n will be lower and the molecular weight distribution narrower if the diisocyanate to macroglycol mole ratio is higher than the required minimum of 2:1 and/or the desired degree of isocyanate group conversion is attained more rapidly. The rate of isocyanate conversion of course can be increased by resort to higher reaction temperatures but is much more desirably achieved by use of a catalyst.

In the absence of a catalyst, the difference in the reactivities of primary and secondary alcoholic hydroxyls with isocyanates is substantial. However, when a catalyst is employed, the rate of conversion of secondary hydroxyls is about the same as for primary hydroxyls. Consequently, essentially no terminal hydroxyls in the polyether glycol remain unconverted in the prepolymer when a catalyst is used. Furthermore, a high proportion of the glycol hydroxyls therein will have been converted by reaction with free diisocyanate molecules, rather than with isocyanate groups in already formed isocyanate/glycol reaction products, thus permitting better control of average n values by manipulation of the reactant ratio.

(The method by which free isocyanate content in the prepolymer is determined, is described subsequently herein).

If the diisocyanate used is of a nature such that removal of unconverted molecules thereof from the prepolymer is feasible, a considerable excess of the diisocyanate may be employed in forming the prepolymer. This of course will tend to minimize the average value of n that can be attained. Further, if the excess diisocyanate present is not considerably reduced before the reaction with the chain extender is carried out, incomplete conversion of the prepolymer isocyanate groups and formation of separate, isocyanate-terminated molecules consisting largely or entirely of hard "segments" will occur.

Generally, removal of diisocyanates even if feasible, will be uneconomical. Accordingly, n value control by diisocyanate to macroglycol mole ratio will ordinarily be within a range of diisocyanate content such that at least a high proportion of molecular species in the final polymer will comprise both soft and hard segments and no unconverted isocyanate groups. That is, the isocyanate index for the prepolymer/diisocyanate/chain extender mixture should be within the range of from about 1.025 to about 1.035.

If the molecular weight of the macroglycol used is increased, allowance should be made for the fact that some reduction in the average n value will tend to occur when a higher molecular weight is opted for. That is, the larger glycol molecules will be less mobile and the resulting increase in the average molecular weight of the prepolymer will be somewhat less than expected.

It is useful, with regard to understanding or interpreting several aspects of segmented polyurethanes, to consider the latter as physical mixtures of separate hard and soft polymers. The polymer molecules are able, to a substantial extent, to coil upon themselves and/or around each other in such a way that soft segments are associated with soft segments and hard segments with hard segments, thereby forming separate "domains" approximating soft and hard bodies of polymer, each exhibiting its own properties in varying degree. Thus, one may speak of the Tg's (glass transition temperatures) and refractive indices of the soft and hard segments.

The elasticity of conventional segmented urethane polymers is generally attributed to domain crystallinity resulting from the action of secondary chemical forces between the associated hard segments, whereas the low temperature performance of the polymers is attributed to the amorphous character of the associated soft segments. Surprisingly, however, the polymers of the present invention, though exhibiting both low and high temperature Tg's and having a quite adequate degree of elasticity, have been shown to be free of domain crystallinity, i.e., completely non-crystalline. This may be rationalized as due to the fact that the aliphatic and cycloaliphatic diisocyanates which have been found essential to the combination of chemical, mechanical and optical properties desired for medical applications are hindered or are mixtures of two or more non-conformable distinct species (stereoisomers, for example), thereby rendering the hard segments incapable of closely "stacking" or "nesting" with each other.

It will be recognized that the proportionately few diisocyanate molecules which "report" in the prepolymer molecules need not be incapable of strongly interacting, although they preferably do not have such capability. However, at least the non-polymeric diisocyanate molecules which become incorporated in the hard segments as the final polymer is formed must be of a nature such that they do not strongly interact, either because they cannot approach each other closely enough or are not sufficiently polarized (etc.) to generate strong secondary bonding between them, or both. As a general rule, this is most readily ensured by using a mixture of diisocyanates of substantially different stereoconfigurations. Preferably, substantially more than 50 mole % of these aliphatic diisocyanate species are cycloaliphatic or highly branched.

Whether or not a given segmented urethane is free of domain crystallinity may be determined by means of X-ray diffraction analysis; small angle X-ray examination is particularly useful for this purpose.

The following generalizations appear to hold.

The macroglycol used in making the prepolymer must consist essentially of alkylene oxide units of more than two carbons, i.e.—not of ethylene oxide units—if higher tensile strengths, percent elongations and better low temperatures are to be achieved in the final polymer without sacrificing flexibility and clarity. At comparable contents in the macroglycol, propylene oxide units give higher 300% modulus values and tensile strengths than do butylene oxide units.

The degree of transparency of the final polymer depends on the degree of match between the refractive indices of the hard and soft segments; the dimensions of the hard segments should be less than the wavelength of visible light.

In order to avoid excessive termination of chain growth during preparation of either the prepolymer or final polymer, the moisture content in the reaction mixture must be minimized. This requires ensuring moisture contents of 0.06 wt. % or less in the macroglycol in particular, but also in the chain extender.

Water take-up (and retention) by the final polymer goes up as the soft segment content is increased to about 60 wt. %. Thereafter, water takeup and retention drop off rapidly as the soft segment content is increased.

Dicyclohexyl methane diisocyanate (DCHMDI) and isophorone diisocyanate (IPDI) are each mixtures of isomers and either can be employed as the sole diisocyanate in both pre- and final polymer preparation. DCHMDI results in a higher tensile modulus but lower tensile strengths, % elongations and low temperature Tg's than IPDI. (In either case, use of ethylene glycol as the chain extender generally results in higher tensile, elongation and low termperature Tg's than does use of 1,4-butane diol). Hexamethylene diisocyanate is a single molecular species and should not be used as the only free diisocyanate present at the start of final polymer formation; its use in the prepolymer results in lower tensile strengths, moduli and low temperature Tg's.

As the Shore hardness of the final polymer increases, the tendency for tubing made of the polymer to kink goes up.

The effects of catalyst use during prepolymer preparation and of the relative amounts of macroglycol, diisocyanate and chain extender are illustrated in the Examples herein.

General Reaction Procedures

The final polymer can be prepard by at least two different procedures which ensure not only the absence of oligomers (in the final product) but also that excessive molecular weight build does not result. In procedure I, the macroglycol is reacted in the absence of a catalyst with at least two moles of the diisocyanate per mole of the glycol to form a prepolymer which is then reacted, in the presence of a catalyst, with a variable amount of a chain extender and such additional diisocyanate as is required to give an isocyanate index of about 1.03. In procedure II, the prepolymer is also formed in the presence of a catalyst. In both procedures, it is essential to attain an adequately high average molecular weight (average n value) in the prepolymer. Accordingly, the diisocyanate is added incrementally (not necessarily dropwise but preferably as a relatively thin stream) to a well stirred body of the polyglycol or polyglycol/catalyst mixture. In procedure II, the addition rate is kept relatively low until the exotherm peaks out. The reaction mixture is then cooled and the diisocyanate addition rate can be increased.

Procedure I (Endothermic)

The prepolymer composition is formed in the absence of a catalyst, by drying the macroglycol at a temperature of 125°–140° C. overnight under vacuum, cooling to about 100°–110° C., adding incrementally and with stirring at least 2 moles of diisocyanate per mole of the glycol, stirring the mixture under vacuum with heating at 100°–110° C. for from about 2 to about 3½ hours, cooling to about 40°–60° C. (or lower, if final polymer preparation is to be delayed). Preferably, the entire amount of the diisocyanate required to react out both the macroglycol and the chain extender is employed in forming the prepolymer.

The final polymer is prepared by adding the chain extender to the prepolymer composition (reheated if necessary), stirring at 40°–60° C. under vacuum until the mixture is again bubble free, adding additional diisocyanate (if necessary) and a catalyst, again stirring under vacuum for about 15 minutes and then "curing" at an elevated temperature (100° C., for example) for a period of about 4 to about 24 hours, preferably about 14 to 20 hours.

The macroglycol/diisocyanate/chain extender mole ratio should be held within the range of from about 1/3/2 to about 1/15/14. (A ratio of 1/2/1 results in low tensile strengths, high elongations and clear polymers and a ratio of 1:10:4 results in high tensile strengths and low to medium elongations but also in opaque polymers.) The overall —OH to —NCO ratio is held within the range of from about 1:1.025 to about 1:1.035.

A stabilizer is usually added to the prepolymer composition before commencing preparation of the final polymer.

Ordinarily, "curing" is carried out with the reaction mixture disposed on a substrate (as a coating or film) or in a mold or as the mixture flows through an extruder.

Procedure II (Exothermic)

This procedure differs from the preceding one in several respects. A catalyst is also present—in a small amount—during prepolymer formation; no heating is required and the total time required to form the prepolymer is reduced to about ½ hour. The prepolymer formation (and the initial stage of final polymer formation) are exothermic. The method used to determine free isocyanate content in the prepolymer is as follows. (The isocyanate conversion attained is calculated by subtraction of the latter content from the amount of isocyante charged). Five 500 ml. Erlenmeyer flasks, fitted with ground glass stoppers, are cleaned and dried. To one of the flasks is added 50 ml. of anhydrous toluene, using a syringe. To the same flask is pipetted 50 ml. of 2 N dibutylamine in anhydrous toluene. The procedure is then repeated for the remaining four flasks. Two of these flasks are set aside to be used as blanks. Approximately 20 ml. of prepolymer is drawn into a syringe. The syringe is wiped clean, capped and weighed. The weight is recorded and the prepolymer delivered to one of the flasks. The syringe is then capped, weighed, and the weight recorded. This procedure is then repeated for the remaining sample flasks. The three sample flasks are then placed on a hot plate that has been preheated to approximately 70° C. and kept there for 20 minutes. The flasks are removed from the hot plate and allowed to cool for 20 minutes. To each of the flasks is added 225 ml. of anhydrous isopropyl alcohol, and a magnetic stirring bar is placed therein. The samples and blanks are then titrated with 1N HCl, using a Metrohm Herisau automatic titrator, to determine the amount of free NCO.

EXAMPLES

The following examples are for purposes of illustration and are not to be construed as limiting the present invention in a manner inconsistent with the claims in this patent.

The term LSP, as used herein, means a linear segmented polyurethane. EO, PO and BO refer, respectively, to ethylene oxide, propylene oxide and butylene oxide.

Example 1

(A) An LSP was prepared by procedure I from an 18% EO/82% PO polyglycol having a molecular weight of 3740, DCHMDI and 1,4-butene diol (BD) in a 1/4.1/3 mole ratio, respectively. The prepolymer composition was formed by reacting 71.1 grams (0.019 moles) of the polyglycol with 18.9 ml (0.077 moles) of the diisocyanate. 5.14 grams (0.057 moles) of the BD and 4 drops of stannous octate were added and the resulting mixture "cured" between metal sheets 4 hours at 255° F. (~124° C.) in an RIM. The resulting polymer was a bubble-free, tough, flexible and translucent elastomer.

(B) Another tough, flexible, bubble-free and translucent LSP elastomer was prepared by otherwise essentially the same procedure but employing a reactant mole ratio of 1/15.4/14.

The mechanical properties of four replicate test specimens of each of the two LSP's (A & B) are given in Table 1.

TABLE 1

| SPECIMEN # | WIDTH | THICKNESS | TENSILE STRENGTH | | ULTIMATE ELONGATION | | MODULUS |
|---|---|---|---|---|---|---|---|
| | INCHES | | LBS | PSI | INCHES | % | PSI |
| A1 | 0.178 | 0.122 | 15.0 | 691 | 3.10 | 354 | 857 |
| 2 | 0.178 | 0.122 | 14.5 | 668 | 2.80 | 320 | 857 |
| 3 | 0.179 | 0.119 | 14.0 | 657 | 2.63 | 300 | 790 |
| 4 | 0.179 | 0.122 | 13.7 | 627 | 2.46 | 281 | 770 |
| Average | (1/4.1/3 mole ratio) | | | 661 | | 314 | 824 |
| B1 | 0.181 | 0.133 | 72.8 | 3024 | 2.03 | 232 | 8517 |
| 2 | 0.181 | 0.132 | 54 | 2260 | 1.50 | 171 | 8720 |
| 3 | 0.181 | 0.137 | 73 | 2944 | 2.17 | 248 | 8112 |
| 4 | 0.181 | 0.129 | 55 | 2356 | 1.80 | 206 | 8327 |
| Average | (1/15.4/14 mole ratio) | | | 2646 | | 214 | 8419 |

Example 2

(A) An LSP was prepared by procedure I from 98.25 grams of VORANOL ® 5287 (registered trademark of The Dow Chemical Company), a 12% EO/88% PO polyglycol having a molecular weight of about 2000, 38.4 ml of DCHMDI and 9.02 grams of BD in a 1/3.1/2 mole ratio, using a cure schedule of 15½ hours at 107° C.

Again, 4 drops stannous octoate catalyst was employed. The resulting elastomer was very tough, flexible, almost transparent and had a light yellow color.

The mechanical properties of four replicate test specimens of the LSP are given in Table 2.

TABLE 2
TENSILE

| SPECIMEN NO. | STRENGTH PSI | ULTIMATE ELONGATION | ELASTIC MODULUS |
|---|---|---|---|
| I | 1465 | 1083% | 911 |
| II | 1288 | 1044% | 997 |
| III | 1380 | 1105% | 941 |
| IV | 1206 | 877% | 1032 |
| Average (1/3.1/2 mole ratio) | 1334 | 1027% | 977 |

(B) Another LSP was prepared in an otherwise essentially identical manner, employing a reactant mole ratio of 1/15.4/14. Two Izod, notched impact test specimens were prepared, stored at −50° C. over a weekend, and tested. The impact values obtained in ft. lbs. per inch, were 9.49 and 9.18 (average 9.34 ft. lbs. per inch).

Example 3

Effect of Polyglycol Composition on Mechanical Properties of Final Polymer

LSP's were prepared from each of three different experimental PO/EO and BO/EO block polyglycols, by procedure I. The polyglycols (see Table 3 for compositions) were each reacted with isophorone diisocyanate (IPDI) and ethylene glycol (EG) in mole ratios (see Table 3A) such as to provide each LSP with a hard segment content of 44 wt. % using stannous octoate as a catalyst and IRGANOX® 1010 (registered trademark of Ciba-Geigy Company) as a stabilizer. Each composition was cured in an air oven for 16 hours at 100° C. and pressure molded to a thin sheet at 185° C. After 5 days at ambient temperature, replicate specimens of each sheet were pulled on an Instron Model TT-C at a crosshead speed of 20 inches per minute. The results are given in Table 3B.

TABLE 3A

| POLYGLYCOL | a | b | c |
|---|---|---|---|
| % OH | 1.503 | 1.909 | 1.293 |
| Molecular Weight | 2,262 | 1,781 | 2,629 |

TABLE 3A-continued

| POLYGLYCOL | a | b | c |
|---|---|---|---|
| % BO | — | — | 76.0 |
| % PO | 64.1 | 80.6 | — |
| % EO Cap. | 35.9 | 19.4 | 24.0 |
| % Unsaturation | 0.018 | 0.020 | — |

TABLE 3B

| POLY GLYCOL | MOLE RATIO | TENSILE STRENGTH | PERCENT ELONG'N. | 300% MODULUS | ELASTIC MODULUS | SET % |
|---|---|---|---|---|---|---|
| a | 1/6.5/5.3 | 4623 psi | 675 | 1229 | 2044 | 6 |
| b | 1/5.15/4 | 5329 | 680 | 1654 | 5071 | 8 |
| c | 1/7.5/6.3 | 4526 | 655 | 1999 | 2436 | 5.2 |

Example 4

Effect of Reactant Mole Ratio on "Curing" Rate (Rate of Reaction of Prepolymer Composition with Chain Extender)

VORANOL® 5287 was reacted by procedure I with DCHMDI and the resultant prepolymer was reacted with BD at 150° C., in a series of six regularly varied mole ratios (see Table 4). The latter reaction was followed by determining the inherent viscosity of each mixture after 2.5, 5.0, 10 and 20 minutes at 150° C.

TABLE 4

| MOLE RATIO OF REACTANTS | INHERENT VISCOSITY (dl/g*) AFTER: | | | |
|---|---|---|---|---|
| | 2.5'** | 5.0' | 10' | 20' |
| 1:3:2 | — | 0.395 | 0.537 | 0.628 |
| 1:4:3 | 0.510 | 0.549 | 0.594 | 0.601 |
| 1:5:4 | 0.419 | 0.443 | 0.477 | 0.475 |
| 1:6:5 | 0.419 | 0.424 | 0.455 | 0.463 |
| 1:7:6 | 0.270 | 0.286 | 0.278 | 0.312 |
| 1:8:7 | 0.163 | 0.192 | 0.208 | 0.218 |

*deciliters/gram.
**time in minutes.

As the mole fraction of the macroglycol decreased from 1/6 to 1/16 (and the chain extender to diisocyanate ratio increased from ⅔ to ⅞), the inherent viscosities after 5, 10 and 20 minutes dropped by 51%, 61% and 65%, respectively. That is, the "cure" rate decreased considerably.

Example 5

Effects of Reactant Ratio on Mechanical Properties of LSP's Prepared in the Manner of Example 4 from the Same Ingredients. Comparison to Medical Grade Polyvinyl Chloride (PVC)

It will be seen from Table 5, following, that as the reactant ratio was progressively changed from 1/2/1 to 1/11/10, tensile strength, modulus and Shore hardness all increased in a regular fashion, whereas the % elongation increased at first, then fell off.

TABLE 5

| SAMPLE | TENSILE STRENGTH PSI | ELONGATION % | TENSILE MODULUS PSI | SHORE HARDNESS | TEAR STRENGTH PSI |
|---|---|---|---|---|---|
| PVC | 1962 | 290 | 923 | 50A | 469 |
| 1/2/1 | 482 | 502 | 393 | 51A | — |
| 1/3/2 | 2238 | 734 | 1190 | 63A | — |
| 1/4/3 | 4145 | 742 | 3160 | 74A | — |
| 1/5/4 | 5030 | 457 | 8062 | 86A | 788 |
| 1/6/5 | 4768 | — | 19807 | 88A | — |
| 1/7/6 | 5548 | 431 | 28290 | 86A | — |
| 1/8/7 | 5691 | 346 | 49207 | 29D | — |
| 1/9/8 | 6271 | 276 | 49412 | 28D | — |

TABLE 5-continued

| SAMPLE | TENSILE STRENGTH PSI | ELONGATION % | TENSILE MODULUS PSI | SHORE HARDNESS | TEAR STRENGTH PSI |
| --- | --- | --- | --- | --- | --- |
| 1/11/10 | 7315 | 277 | 78840 | 30D | — |

Example 6

Effects of Reactant Ratio on LSP's Made in the Manner of Example 2 from VORANOL 5287, IPDI and EG It will be seen from Table 6, following, that tensile strength, tear strength, elastic modulus and tear strength all increased in a regular fashion as the reactant ratio was changed from 1/4.65/3.5 to 1/6.18/5 to 1/8.24/7, and the % elongation decreased accordingly.

TABLE 6

| RATIO OF REACTANTS | TENSILE STRENGTH PSI | ULTIMATE ELONGATION % | ELASTIC MODULUS PSI | TEAR STRENGTH PSI | SET % |
| --- | --- | --- | --- | --- | --- |
| 1/4.65/3.5 | 5334 | 820 | 7150 | 518 | 14 |
| 1/6.18/5 | 7143 | 698 | 11072 | 910 | 30 |
| 1/8.24/7 | 7446 | 476 | 43925 | 1238 | 39 |

Example 7

Comparisons of Typical LSP's of the Invention with Other Types of Thermoplastics Which Have Been Proposed or Used for Medical Devices Three LSP's of the invention, made in the manner of Example 2 from VORANOL 5287, IPDI and EG at different mole ratios, were compared as to mechanical properties with a linear, low density polyethylene (DOWLEX 2045; registered trademark of The Dow Chemical Company) and with the properties reported for a conventional medical grade polyurethane elastomer (prepared from polytetramethylene oxide, methylene bis(4-cyclohexyl isocyanate) and 1,4-butanediol, by Wong, Frisch et al., *Structure Property Relationships of Transparent Cycloaliphatic Polyurethane Elastomers*, 18th Natl. ACS Meeting, Washington, D.C. (1983)).

TABLE 7

| SAMPLE | TENSILE STRENGTH PSI | ULTIMATE ELONG'N. % | MODULUS PSI | TEAR STRENGTH PSI | % SET | SHORE A HARDNESS |
| --- | --- | --- | --- | --- | --- | --- |
| DOWLEX 2045 | 4563 | 764 | 41022 | 1257 | 676 | — |
| WONG | 3489 | 674 | 5947 | — | — | 92 |
| 1/5.0/3.76 | | | | | | |
| INVENTION | | | | | | |
| 1/4.65/3.5 | 5334 | 820 | 7220 | 518 | 14 | — |
| 1/5.16/4.0 | 5064 | 470 | 9320 | 402 | — | 90 |
| 1/6/5 | 7143 | 698 | 11072 | 910 | 30 | — |

The superiority of the urethane of the invention as a medical polymer is apparent from the preceding Table.

Example 8

Resistance of a Typical LSP of the Invention to Oxidative Degradation

The times to failure of test specimens of an LSP of the present invention, made from VORANOL 5287, IPDI and EG at a 1/5.15/4 mole ratio, by the method of Example 2 and including successively greater amounts of a stabilizer (IRGANOX 1076; registered trademark of Ciba-Geigy Co.) were determined. Failure was judged by percent loss of tensile strength. The results are given in Table 8, following.

TABLE 8

| STABILIZER CONTENT Parts Per Million | HOURS* TO FAILURE** |
| --- | --- |
| ~200 | ~30 |
| ~500 | ~100 |
| ~1000 | ~200 |
| ~2000 | ~1100 |

*At 120° C. in air.
** ≧30% loss of tensile strength.

Example 9

Effects of UV and Gamma Ray Irradiation on Color and Mechanical Properties of an LSP of the Invention, Employing Different Amounts of Several Different Stabilizers Eight essentially identical batches of the LSP were made from VORANOL 5287, DCHMDI and BD in a 1/4.12/3 mole ratio, essentially in the manner of Example 3. The amounts and kinds of stabilizers incorporated in each batch are given in Table 9A.

Samples of each batch were irradiated with UV, in a Q-UV Accelerated Weathering Test Chamber marketed by Q-Panel Co., for the time periods noted in Table 9B. Also given in the Table are the gamma ray dosages to which other samples of the batches were subjected; the Yellowness Indices of all the irradiated samples are given in the same Table.

The mechanical properties of the gamma ray irradiated samples are compared, in Table 9C, with the properties of otherwise essentially identical but non-irradiated samples of each batch.

TABLE 9A

| BATCH | IRGANOX[1] 1010 WT. % | IRGAFOS[1] 168 WT. % | TINUVIN[1] 328 WT. % | TINUVIN[1] 765 WT. % |
|---|---|---|---|---|
| 3A | 0.25 | | | |
| 3B | 0.20 | 0.20 | | |
| 5A | 0.25 | | 0.75 | |
| 5B | 0.25 | | 0.375 | 0.375 |
| 5C | 0.25 | | | 0.75 |
| 5D | 0.20 | 0.20 | 0.75 | |
| 5E | 0.20 | 0.20 | 0.375 | 0.375 |
| 5F | 0.20 | 0.20 | 0.75 | |

NOTES:
[1]Registered trademark of Ciba-Geigy Co.

TABLE 9B

| | YELLOWNESS INDEX | | | | | | | |
|---|---|---|---|---|---|---|---|---|
| BATCH SAMPLE IRRADIATED | 0 HRS. UV | 48 HRS. UV | 172 HRS. UV | 240 HRS. UV | 405 HRS. UV | APPROX. % INCREASE AFTER 405 HRS. UV | GAMMA RADIATION 5.2–5.3 M RADS | APPROX. % INCREASE AFTER GAMMA IRRADIATION |
| 3A | 3.0 ± .1 | — | 3.2 ± .2 | 3.1 ± .3 | 3.9 ± .3 | 30[1] | 4.1 ± .3 | 36.7[2] |
| 3B | 2.8 ± .1 | — | 3.4 ± .2 | 3.1 ± .3 | 4.0 ± .3 | 42.9 | 3.7 ± .2 | 32.1 |
| 5A | 15.1 ± 1.2 | 14.9 ± .8 | 15.8 ± .4 | 15.9 ± .3 | 15.9 ± .2 | 0[3] | 25.5 ± 2.4 | 6.9 |
| 5B | 15.3 ± .8 | 17.7 ± .1 | 18.2 ± .4 | 18.1 ± .3 | 17.6 ± .5 | 15.0 | 13.8 ± 4.0 | 0[4] |
| 5C | 6.5 ± .7 | 6.7 ± 0 | 8.5 ± .5 | 8.1 ± .5 | 8.6 ± .5 | 32.3 | 11.6 ± 2.1 | 78.5 |
| 5D | 12.9 ± .3 | 13.4 ± .3 | 14.4 ± .2 | 13.8 ± .6 | 13.8 ± .4 | 0[4] | 20.3 ± 1.4 | 57.4 |
| 5E | 16.7 ± .8 | 20.6 ± 1.2 | 21.3 ± .7 | 19.4 ± .7 | 16.2 ± .8 | 0[4] | 18.9 ± 1.1 | 13.2 |
| 5F | 10.3 ± .3 | 11.1 ± .4 | 12.8 ± .7 | 10.9 ± .4 | 11.8 ± .3 | 14.6 | 15.8 ± .4 | 53.4 |

NOTES:

[1]Calculated as $\left(\frac{3.9 - 3.0}{3.0}\right) \times 100 = 30\%$.

[2]Calculated as $\left(\frac{4.1 - 3.0}{3.0}\right) \times 100 = 36.7\%$.

[3]Difference between (15.7–16.1) and (13.9–16.3) not considered significant.
[4]Difference not considered significant.

TABLE 9C

MECHANICAL PROPERTIES OF NON-IRRADIATED AND IRRADIATED SAMPLES

| BATCH | TENSILE STRENGTH PSI | ELONGATION % | MODULUS PSI | 300% MODULUS PSI | 10 MINUTE SET % |
|---|---|---|---|---|---|
| 3A | 3170 ± 253[1/] | 796 ± 74 | 1167 ± 37 | 432 ± 10 | — |
|    | 1826 ± 348[2/] | 640 ± 44 | 972 ± 28 | 400 ± 4 | 39 ± 9 |
| 3B | 3354 ± 380 | 781 ± 105 | 1410 ± 23 | 452 ± 4 | 37 |
|    | 1878 ± 41 | 789 ± 18 | 1025 ± 24 | 402 ± 4 | 41 ± 3 |
| 5A | 2245 ± 265 | 812 ± 5 | 915 ± 93 | 370 ± 21 | 28 ± 2.5 |
|    | 1724 ± 164 | 682 ± 49 | 915 ± 25 | 385 ± 11 | 62 ± 3 |
| 5B | 2256 ± 438 | 728 ± 268 | 1055 ± 30 | 420 ± 2 | 50 ± 5 |
|    | 1866 ± 148 | 771 ± 93 | 860 ± 16 | 355 ± 2 | 76 ± 8 |
| 5C | 3093 ± 625 | 767 ± 256 | 1505 ± 16 | 502 ± 3 | 39 ± 8 |
|    | 2246 ± 113 | 809 ± 111 | 940 ± 11 | 372 ± 3 | 74 ± 9 |
| 5D | 3139 ± 89 | 811 ± 9 | 1355 ± 19 | 442 ± 2 | 39 ± 6 |
|    | 2753 ± 257 | 804 ± 119 | 1655 ± 97 | 492 ± 7 | 59 ± 5 |
| 5E | 2914 ± 229 | 809 ± 3 | 1375 ± 78 | 440 ± 17 | 33 ± 3 |
|    | 2346 ± 328 | 718 ± 158 | 1325 ± 26 | 482 ± 13 | 51 ± 6 |
| 5F | 2978 ± 121 | 809 ± 3 | 1245 ± 46 | 432 ± 7 | 32 ± 1.4 |
|    | 2332 ± 619 | 720 ± 347 | 1360 ± 27 | 457 ± 2 | 50 ± 13 |

NOTES FOR TABLE 9C
[1/]The upper row of values for each batch were obtained on samples which had not been irradiated.
[2/]The lower row of values for each batch were obtained with samples subjected to 5.2–5.3 megarads of gamma ray irradiation.

It will be seen that batches 3A, 3B and 5C were poorly stabilized or even adversely effected, as to both discoloration and mechanical properties, by the stabilizers used therein. At the other extreme, batch 5A was very well stabilized in both regards by the 0.25/0.75 combination of IRGANOX 1010 and TINUVIN 328.

Example 10

Comparison of Otherwise Identical LSP's Made by Procedures I and II, using VORANOL 5287, DCHMDI and EG at 1/5.15/4 Mole Ratio A. Procedure I To a 5-l. flask was added 2316.3 g (1.1788 moles) of oligomeric PO/EO diol, (VORANOL 5287). The diol was heated at 130° C. for 1.5 hours to dehydrate and degas it, cooled to 100° C. and 1590.5 g (6.071 moles) of DCHMDI, i.e., methylene bis(4-cyclohexyl isocyanate) was added incrementally with stirring. The flask contents were stirred and heated at 100° C./.05 mm. for 2 hours. At the end of that time, the reaction mixture was cooled to 60° C. and 8.4 g. (0.02% by wt.) IRGANOX 1076 stabilizer was added, with stirring. The flask contents were further cooled to 45° C. and 292.7 g (4.713 moles) of distilled ethylene glycol (EG) was added. The flask contents were vacuum degassed and then poured into a 5-l. beaker. To the beaker was added 2.10 g., (1 ml/2 Kg. of reactants) of stannous octoate catalyst. The reactants were stirred until the temperature of the exothermic reaction reached 50° C. The mixture was then poured into polypropylene pans, which were placed in a circulating air oven and cured at 100° C. for 16 hours. A linear, segmented polyurethane having a mole ratio of VORANOL 5287:DCHMDI:EG of 1:5.15:4 was obtained.

B. Procedure II

To a 5-l. flask was added 1137.6 g. (0.563 mole) of VORANOL 5287. The flask was left open and the contents were heated to 135° C. Vacuum was then applied and the system was heated at 135° C./0.5 mm for 1 hour. The diol was cooled to 65° C. and 759.6 g (2.90 moles) of methylene bis(4-cyclohexyl isocyanate) were added incrementally with stirring. When the DCHMDI was thoroughly mixed, 0.11 ml of stannous octoate catalyst was added. The system was again stirred under vacuum while the exotherm from the catalyzed reaction of diisocyanate with the diol maintained the temperature of the reactants at approximately 65° without external heating. After 0.5 hour, the reaction temperature began to drop, so the vacuum was disconnected and the flask was opened. A sample was withdrawn for free NCO determination. IRGANOX 1076 stabilizer, 9.5 g (0.5% by wt.) was added with stirring under vacuum, while the flask contents were being cooled to 45° C. At this point, 183.6 g. (2.04 moles) of 1,4-butanediol was added, and the system was put under vacuum for 1.5 hours to remove any gases and traces of water. The remainder of the stannous catalyst (0.86 ml) was added and the system was vacuum degassed, with stirring. When the temperature of the mixture reached 48°–50° C., the mixture was poured into polypropylene pans and cured in a circulating air oven at 100° C. for 16 hours. A linear, segmented polyurethane having a mole ratio of VORANOL 5287:DCHMDI:1,4-butanediol of 1:5.15:4 again was obtained.

A number of essentially identical runs were carried out with each of the two procedures. The resulting LSP's are compared as to tensile strength and percent elongation in Table 10 following.

TABLE 10

TENSILE AND ELONGATION VALUES FOR LSP'S PREPARED FROM:

| | Uncatalyzed Prepolymer | | | Catalyzed Prepolymer | |
|---|---|---|---|---|---|
| Run No. | PSI Tensile | Percent Elongation | Run No. | PSI Tensile | Percent Elongation |
| A-1 | 1036 | 428 | B-1 | 2967 | 666 |
| 2 | 1022 | 343 | 2 | 2927 | 656 |
| 3 | 2896 | 606 | 3 | 2751 | 555 |
| 4 | 4225 | 496 | 4 | 3425 | 661 |
| 5 | 1800 | 427 | 5 | 2874 | 639 |
| 6 | 1759 | 538 | 6 | 3356 | 618 |
| 7 | 2737 | 615 | 7 | 2873 | 586 |
| Avg. | 2210 | 493 | 8 | 2896 | 607 |
| S. Dev. | 1152 | 101 | Avg. | 3009 | 623 |
| | | | S. Dev. | 244 | 39 |

It will be seen that much better reproducibility and quite substantial increases in average tensile strengths and elongations resulted from prepolymer catalysis.

Example 11

Effect of Reactant Ratio on Water Uptake of LSP's Made by Procedure I from VORANOL 5287, DCHMDI and BD (or EG)

The water uptake of film samples prepared from the preceding ingredients at reactant ratios corresponding to successively higher contents of the VORANOL were determined. Each sample was weighed, immersed in water for 300–400 hours, removed, wiped "dry" with tissue and reweighed. The results are given in Table 11, following.

TABLE 11

| REACTANT RATIO[1] | WT. % SOFT SEGMENTS | WATER UPTAKE WT. % |
|---|---|---|
| 1:10:9 | 38.0 | 2.47 |
| 1:9:8 | 39.0 | 2.41 |
| 1:8:7 | 41.0 | 2.60 |
| 1:7:6 | 45.0 | 2.68 |
| 1:6:5 | 50.0 | 2.76 |
| 1:5:4 | 54.0 | 2.80 |
| 1:4:3 | 55.9 | 2.96 |
| 1:3:2 | 66.0 | 1.62 |
| 1:2:1 | 75.6 | 1.42 |
| 1:5:4 | 55.5 | 2.83[2] |

NOTES:
[1] VORANOL 5287/DCHMDI/BD
[2] VORANOL 5287/DCHMDI/EG

The water uptake found by the same method for medical grade polyvinylchloride was 0.275 wt. %. For two commercial polyether urethanes, Quinn PE-192 and TECOFLEX 80A (made by Thermedics Inc.,), the uptakes were 3.57 and 3.94 wt. percents, respectively.

EXAMPLE 12

$O_2$ and $CO_2$ Permeability Coefficients and Water Vapor Transmission Rates for LSP Films The gas and vapor transmission rates determined for films prepared from seven LSP's of the invention and seven commercial polymers are given in Table 12 following. Six of the LSP's were derived from VORANOL 5287, DCHMDI and BD or EG and the other from the same VORANOL, IPDI and EG.

TABLE 12

| FILM COMPOSITION | RATIO | THICKNESS MILS | $P_{O_2}$[1] | $P_{CO_2}$[1] | $J_{H_2O}$[2] |
|---|---|---|---|---|---|
| VORANOL 5287/DCHMDI/BD | 1/4/3 | 7 | 7.744 ± 0.277 | 63.207 ± 0.992 | — |
| VORANOL 5287/DCHMDI/EG | 1/4/3 | 7 | 7.213 ± 0.162 | 67.435 ± 1.845 | 51.8 |
| VORANOL 5287/DCHMDI/BD | 1/5/4 | 8.54 | 5.456 ± 0.130 | 48.946 ± 0.862 | — |
| VORANOL 5287/DCHMDI/EG | 1/5/4 | 8.54 | 5.2503 ± 0.1582 | 51.182 ± 0.887 | 50.4 |

TABLE 12-continued

| COMPOSITION | FILM RATIO | THICKNESS MILS | $P_{O_2}{}^1$ | $P_{CO_2}{}^1$ | $J_{H_2O}{}^2$ |
|---|---|---|---|---|---|
| VORANOL 5287/DCHMDI/BD | 1/7/6 | 8.54 | 2.8703 ± 0.1220 | 26.1005 ± 0.5045 | — |
| VORANOL 5287/DCHMDI/BD | 1/10.39/9 | — | 1.16 | 10.3 | |
| VORANOL 5287/IPDI/EG | 1/5.15.4 | 8.98 | 5.637 ± 0.231 | 51.507 ± 0.508 | — |
| COMMERCIAL BLOOD BAG (Cutter) | | Single 12.70 | 6.10 | 36.14 | 68.8 |
| | | Double 16.0 | 3.17 ± 0.07 | 17.76 ± 0.68 | 60.8 |
| DOWLEX POLYETHYLENE | | 1 | — | — | 2.0 |
| COMMERCIAL (Delmed) T7205 (dry) | | 15.50 | 3.011 ± 0.094 | 18.930 ± 0.345 | 57.35 |
| COMMERCIAL (Delmed) T7205 (wet) | | 16.07 | 3.0936 ± 0.2038 | 19.1401± 0.562 | 52.5 |
| COMMERCIAL (Fenwall) PL-146 (dry) | | 15.44 | 3.0237 ± 0.0378 | 18.169 ± 0.230 | 60.1 |
| COMMERCIAL (Fenwall) PL-I46 (wet) | | 15.72 | — | — | 61.3 |

NOTES FOR TABLE 12:
[1] (cc × cm)/(cm$^2$ × seconds × cm$_{Hg}$) × 10$^{10}$ Measured at 25° C. and Δ = 250 KPa.
[2] Grams/meter$^2$/day. Measured at 37.7° C. and 100% relative humidity. Normalized to 5 mils thickness.

It will be seen that EG, as the chain extender, was more selective than BD for $CO_2$ over $O_2$, at all ratios in combination with DCHDI. Also, the higher the relative content of the VORANOL, the higher the $O_2$ and $CO_2$ permeabilities but the lower the water vapor transmission rates were. Finally, the $O_2$ and $CO_2$ permeabilities of the LSP films were generally higher than the permeabilities of the commercial films. It is evident that blood stored in bags made of the LSP's of the invention will be able to "breathe" better, which results in longer maintenance of blood pH above the level (<6) at which a loss in platelet viability occurs; i.e., longer shelf life for the blood results.

EXAMPLE 13

Refractive Indices of Representative Films Composed of VORANOL 5287, DCHMDI and EG Clear films, 0.10–0.17 mm thick, were prepared from polymers derived from the named ingredients in the mole ratios given in the following Table 13. The films were sliced into small pieces with a scalpel, immersed in liquids of known refractive indices on a microscope slide and covered with a #1 glass. The refractive indices of the film samples were obtained by observing each sample under polarized light with a Leitz Ortholux microscope at 125 magnifications, using a 10X(n.a. 0.25) objective lens with a reduced angular aperature, at room temperature (22°-3° C.). The immersion standards were Cargille RF-1 liquids, Series A and AA, which differed in refractive index in increments of 0.002 units and were stated to be correct to ±0.0002 units at 25° C.

For comparison, the literature refractive indices of several known polymeric materials are included in the Table.

TABLE 13

| URETHANE REACTANT RATIO | REFRACTIVE INDEX | |
|---|---|---|
| | MEASURED 22–23° C. | CORRECTED 25° C. |
| 1/8.24/7 | 1.49–1.50 | 1.492–1.498 |
| 1/5.15/4 | 1.46–1.47 | 1.464–1.474 |
| 1/3.85/2.5 | 1.48 | 1.476–1.484 |
| POLYSTYRENE | | 1.59–1.60 |
| POLYETHYLENE | | 1.49–1.52 |
| POLY(METHYLMETHACRYLATE) | | 1.49–1.50 |
| POLYVINYL CHLORIDE | | 1.54–1.55 |
| CELLULOSICS | | 1.51–1.54 |
| POLYBUTADIENE | | 1.51–1.53 |
| POLYCARBONATES AND POLYESTERCARBONATES | | 1.59–1.61 |

Prepolymer Molecular Weights

The following molecular weights were determined by GPC (Gel Permeation Chromatography) against polystyrenes of known molecular weight.

| | |
|---|---|
| VORANOL ® 5287 (nominal mol. wt. about 2000): | |
| # average mol. wt. | 1809 |
| Wt. average mol. wt. | 3135 |
| Typical uncatalyzed prepolymer (2:1 HMDI/VORANOL ® 5287): | |
| # average mol. wt. | 2045 |
| wt. average mol. wt. | 4618 |

TABLE 14

TYPICAL MOLECULAR WEIGHTS AND PHYSICAL PROPERTIES[1]
OF FINAL POLYMERS MADE AT DIFFERENT OVERALL REACTANT RATIOS
FROM CATALYZED PREPOLYMER AND BUTANE DIOL

| Glycol[2]DCHMDI[3]/BD Ratio | No. Average Mol. Wt. | Wt. Average Mol. Wt. | Tensile Strength Lb./Sq. In. | Percent Elongation | 300% Modulus Lb./Sq. In. | Percent Set |
|---|---|---|---|---|---|---|
| 1/5.15/4 | 75,316[3] | 162,136[3] | 4201 | 533.8 | 2,025 | 16.7 |
| 1/6.18/5 | 61,653 | 138,630 | 4567 | 514.9 | 2,479 | 39.6 |
| 1/7.21/6 | 90,951 | 198,235 | 4614 | 354.1 | 3,880 | 110.4 |
| 1/8.24/7 | 83,043 | 198,289 | 5319 | 339.8 | 4,634 | 145.8 |
| 1/9.27/8 | 73,165 | 145,637 | 6177 | 318.1 | 5,710 | 137.5 |

TABLE 14-continued
TYPICAL MOLECULAR WEIGHTS AND PHYSICAL PROPERTIES[1] OF FINAL POLYMERS MADE AT DIFFERENT OVERALL REACTANT RATIOS FROM CATALYZED PREPOLYMER AND BUTANE DIOL

| Glycol[2]DCHMDI[3]/BD Ratio | No. Average Mol. Wt. | Wt. Average Mol. Wt. | Tensile Strength Lb./Sq. In. | Percent Elongation | 300% Modulus Lb./Sq. In. | Percent Set |
|---|---|---|---|---|---|---|
| 1/10.3/9 | 75,984 | 161,989 | 6010 | 272.9 | — | 154.2 |
| 1/11.33/10 | 74,838 | 187,610 | 4317 | 193.8 | — | 135.4 |
| 1/12.36/11 | 76,182 | 168,324 | 5638 | 214.7 | — | 143.8 |
| 1/13.39/12 | 78,038 | 157,087 | 6300 | 214.5 | — | 156.3 |
| 1/14.42/13 | 66,028 | 144,315 | 6144 | 204.5 | — | 154.2 |

NOTES:
[1]Average of six replicates, each.
[2]VORANOL ® 5287.
[3]Averages for three different batches.

Biological Testing of LSP's of the Invention

Two representative LSP's, consisting of VORANOL 5287, DCMDI and ethylene glycol in mole ratios of 1/4/3 and 1/5/4 were subjected to USP XX Class IV Biological testing. The tests, and results, are summarily described below.

| | | |
|---|---|---|
| 1. | Hemolysis - Direct contact with unbuffered human blood. | Passed. |
| 2. | Physico-Chemical - Heavy metals, buffering capacity, non-volatile residue on ignition. | Passed. |
| 3 | Cytotoxicity - MEM elution extracts of polymer put in contact with F2000 human cell line monolayer for 24 hours. | Non-cytotoxic |
| 4. | Systemic Injection - Polymer extracted with each of saline solution, 5% aq. EtOH, polyethylene glycol 400 and vegetable oil. Extracts injected in mice. | Non-toxic. |
| 5. | Seven-Day Implant - Sample of polymer subcutaneously implanted in six rabbits. | Non-toxic. |

Specific other types of medical devices for which the LSP's of the invention are considered suitable include parenteral intravenous solution bags and continuous ambulatory peritoneal dialysis bags.

Non-medical utilities contemplated for LSP's of the invention include applications in non-lacerating windshields, solar window panes, security and safety glasses, glass/polycarbonate laminar structures, ski equipment, auto bumpers, dashboards and glue layers for film laminations.

What is claimed is:

1. The method of preparing a urethane prepolymer composition in which said prepolymer consists essentially of generally linear molecules terminated at each end by an isocyanate group, said molecules consisting of n branched, polyether glycol residues joined, through intervening carbamate groups, with (n+1) diisocyanate residues, n ranging from 1 to about 4 and the average value of n being within the range of from about 1.5 to about 1.7;
said method comprising
(1) providing one molecular proportion of a methylol-terminated, branched polyether glycol, optionally in admixture with an amount of a catalyst insufficient to cause gelling if the prepolymer composition-to-be is later mixed with a chain extender,
(2) while stirring said glycol or glycol/catalyst mixture and heating as may be necessary to drive the reaction, incrementally adding to it at least two molecular proportions of a non-aromatic diisocyanate, and
(3) allowing the reaction to proceed until the isocyanate content has dropped by an amount corresponding to complete conversion of the glycol,
said glycol having a weight average molecular weight of from about 1000 to about 6000 and consisting essentially of chains of —O—CRR'—$CH_2$—units in which each of R and R' is H, methyl or ethyl, independently, except that in at least a preponderance of said units one or the other of R and R' is not H.

2. The method of claim 1 wherein said diisocyanate is an aliphatic or cycloaliphatic diisocyanate.

3. The method of claim 1 wherein more than two molecular proportions of said diisocyanate are employed in step (1) and said diisocyanate is of a nature such that if said composition is reacted with a chain extender, the resulting polymer will be essentially free of domain crystallinity.

4. The method of claim 3 wherein said diisocyanate is a mixture of isomeric, cycloaliphatic diisocyanate species.

5. The method of claim 4 wherein said mixture consists of isophorone diisocyanate isomers or di(isocyanatocyclohexyl)methane isomers.

6. The method of claim 1 wherein at least 95 percent of the molecules of said polyether glycol may be represented by the ideal formula:

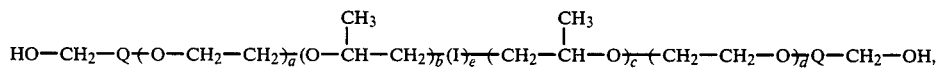

wherein I is the residue of a difunctional initiator, e is zero or 1, Q may be the same or different in each occurrence and is a $C_1$–$C_{10}$ alkylene or alkylcycloalkylene group and a, b, c and d are integers such that the molecular weight of said glycol is within said range of from about 1000 to about 6000.

7. The method of claim 6 wherein Q is $CH_2$ and the ratio of (a+d) to (b+c) is such that the overall ethylene oxide to propylene oxide weight ratio in the glycol is not greater than 20/80.

8. The method of claim 1 wherein a catalyst is employed.

9. The method of claim 8 wherein said diisocyanate is a mixture of isophorone diisocyanate isomers or di(isocyanatocyclohexyl)methane isomers.

10. The method of claim 9 wherein at least 95% of the molecules of said polyether glycol may be represented by the following ideal formula:

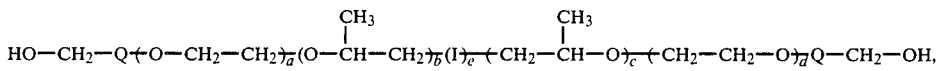

wherein I is the residue of a difunctional initiator, e is zero or 1, Q is $CH_2$ and a, b, c and d are integers such that the molecular weight of the polyglycol is within said range of from about 1000 to about 6000.

11. The method of claim 1 additionally comprising converting said prepolymer composition to a final polymer composition comprising a repeating block, oligomer-free, polyphase, thermoformable, segmented polyurethane which has a weight average molecular weight of about 100,000 or more and consists essentially of alternating hard and soft segments, said conversion being by
  (i) adding to the prepolymer composition such additional amount of a diisocyanate as may be required to provide a total of up to about 10 molecular proportions of free and converted diisocyanate per molecular proportion of said polyether glycol, with the proviso that the free diisocyanate present when the following step (ii) is initiated is of a nature such that the final polymer will be essentially free of domain crystallinity,
  (ii) mixing with the prepolymer composition, separately or in admixture with any diisocyanate added in (i), a chain extender which is a short chain, nonflexibilizing compound having from 2 to 4 isocyanate-reactive functional groups, the amount of said chain extender being such that the isocyanate index for the resulting mixture is from about 1.025 to about 1.035, and
  (iii) adding a catalyst and allowing said isocyanateterminated prepolymer, the free diisocyanate and said chain extender to react, thereby forming said final polymer,
said soft segments being contributed to said final polymer by said prepolymer and said hard segments being formed by the interaction of the chain extender with isocyanate terminations of the prepolymer and with free diisocyanate molecules.

12. The method of claim 11 wherein said diisocyanate present when said step (ii) is initiated consists of one or more aliphatic or cycloaliphatic diisocyanates.

13. The method of claim 12 wherein said diisocyanate is a mixture of isophorone isomers or di(isocyanatocyclohexyl)methane isomers.

14. The method of claim 11 wherein said polyether glycol consists essentially of molecules which may be represented by the following ideal formula:

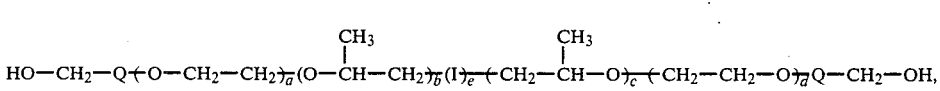

wherein I is the residue of a difunctional initiator, e is zero or 1, Q may be the same or different in each occurrence and is a $C_1$-10 alkylene or alkylcycloalkylene group, and a, b, c and d are integers such that the molecular weight of said polyglycol is within said range of from about 1000 to about 6000.

15. The method of claim 14 wherein Q is $CH_2$ and the ratio of (a+d) to (b+c) is such that the overall ethylene oxide to propylene oxide weight ratio in the polyglycol is not greater than 20/80.

16. The method of claim 11 wherein a catalyst is employed in preparing said prepolymer composition.

17. The method of claim 11 wherein said chain extender is 1,4-butane diol or ethylene glycol.

18. The method of claim 15 wherein a catalyst is employed in preparing said prepolymer composition, the free diisocyanate present when step (ii) is initiated consists of one or more aliphatic or cycloaliphatic diisocyanates and the chain extender is 1,4-butane diol or ethylene glycol.

19. The method of claim 11 in which the polyglycol to diisocyanate to chain extender mole ratio is within the range of from 1/3/2 to 1/15/14.

20. The method of claim 18 wherein the polyglycol to diisocyanate to chain extender mole ratio is within the range of from 1/4/3 to 1/6/5.

21. The method of claim 20 in which said ratio is 1/about 5/about 4.

22. The method of claim 21 in which the free diisocyanate present when step (ii) is initiated is a mixture of isophorone isomers or di(isocyanatocyclohexyl)methane isomers.

23. The method of claim 11 in which said polyglycol is an ethylene oxide capped polypropylene glycol having a molecular weight of from about 1900 to about 2100 and an overall ethylene oxide to propylene oxide weight ratio of about 12/88.

24. The method of claim 20 in which said polyglycol is an ethylene oxide capped polypropylene glycol having a molecular weight of from about 1900 to about 2100 and an overall ethylene oxide to propylene oxide weight ratio of about 12/88.

25. The method of claim 22 in which said polyglycol is an ethylene oxide capped polypropylene glycol having a molecular weight of from about 1900 to about 2100 and an overall ethylene oxide to propylene oxide weight ratio of about 12/88.

26. A urethane prepolymer, optionally in admixture with non-polymeric molecules of one or more non-aromatic diisocyanates, said prepolymer consisting essentially of generally linear molecules terminated at each end by an isocyanate group and consisting of n branched, polyether glycol residues joined, through intervening carbamate groups, with (n+1) non-aromatic diisocyanate residues, n ranging from 1 to about 4 and having an average value of about 1.5 to about 1.7 and said glycol being methylol terminated, having a weight average molecular weight of from about 1000 to about 6000 and consisting essentially of chains of —O—CRR'—$CH_2$— units in which each of R and R' is H, methyl or ethyl, independently, except that in at least a preponderance of said units one or the other of R and R' is not H.

27. A prepolymer as in claim 26 wherein at least 95% of the molecules of said polyglycol may be represented by the following ideal formula:

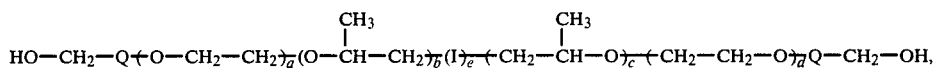

wherein I is the residue of a difunctional initiator, e is zero or 1, Q may be the same or different in each occurrence and is a $C_1$-$C_{10}$ alkylene or alkylcycloalkylene group, and a, b, c and d are integers such that the molecular weight of said glycol is within said range of from about 1000 to about 6000.

28. A prepolymer as in claim 26 in which said diisocyanate residues are derived from one or more aliphatic or cycloaliphatic diisocyanates.

29. A prepolymer as in claim 27 in which said diisocyanate residues are derived from one or more aliphatic or cycloaliphatic diisocyanates.

30. A prepolymer of claim 26 in admixture with one or more non-polymeric, non-aromatic diisocyanate.

31. A prepolymer of claim 27 in admixture with one or more non-polymeric, non-aromatic diisocyanate.

32. A prepolymer of claim 28 in admixture with a non-polymeric, non-aromatic diisocyanate which consists of one or more aliphatic or cycloaliphatic diisocyanates.

33. A prepolymer of claim 29 in admixture with one or more aliphatic or cycloaliphatic diisocyanates which are the same as those from which said residues are derived.

34. A prepolymer of claim 29 in which Q is —$CH_2$— and the values of a, b, c and d are such that said polyglycol has a molecular weight of from about 1900 to about 2100 and the weight ratio of —O—$CH_2$—$CH_2$ to —O—$CHCH_3$—$CH_2$— units therein is not greater than about 20/80.

35. A prepolymer of claim 33 in which Q is —$CH_2$ and said values of a, b, c and d are such that said polyglycol has a molecular weight of from about 1900 to about 2100 and the weight ratio of —O—$CH_2$—$CH_2$— to —O—$CHCH_3$—$CH_2$— units therein is about 12/88.

36. A repeating block, oligomer-free, polyphase, thermoformable, segmented polyurethane which is free of domain crystallinity, has a weight average molecular weight of from about 100,000 to about 200,000 and consists essentially of alternating soft and hard segments;

said soft segments being derivable from the reaction of:
(1) generally linear molecules terminated at each end by an isocyanate group and consisting of
(a) n residues of one or more methylolterminated polyether glycols having molecular weights of from about 1000 to about 6000 and consisting essentially of chains of —O—CRR'—$CH_2$— units in which each of R and R' is H, methyl or ethyl independently, except that in at least a preponderance of said units one or the other of R and R' is not H, and (b) (n+1) residues of one or more non-aromatic diisocyanates, joined to said polyether glycol residues by intervening carbamate groups,
n ranging from 1 to about 4 and having an average value of from about 1.5 to about 1.7, and said hard segments being derivable from the reaction of a chain extender with the isocyanate end groups in said molecules and with one or more non-aromatic, non-polymeric diisocyanates of a nature such that the resulting carbamate groups will be unable to associate with each other in such manner as to result in domain crystallinity in the resulting polymer, the mole ratio of the polyglycol to diisocyanate to chain extender being within the range of from about 1/3/2 to about 1/15/14 and the overall isocyanate index being within the range of from about 1.025 to about 1.035.

37. A polymer of claim 36 wherein said polyglycol residues are derivable from a polyether glycol consisting essentially of molecules of the formula:

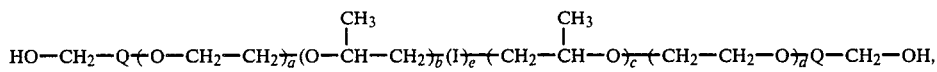

wherein I is the residue of a difunctional initiator, e is zero or 1, Q may be the same or different in each occurrence and is a $C_1$-$C_{10}$ alkylene or alkylcycloalkylene group, and a, b, c and d are integers such that the molecular weight of said glycol is within said range of from about 1000 to about 6000.

38. A polymer of claim 36 wherein said hard segments are derivable from the reaction of a chain extender with the isocyanate end groups in said molecules and with a mixture of isomers of one or more aliphatic or cycloaliphatic diisocyanates.

39. A polymer of claim 37 in which said hard segments are derivable from the reaction of a chain extender with the isocyanate end groups in said molecules and with a mixture of isomers of one or more aliphatic or cycloaliphatic diisocyanates.

40. A polymer of claim 36 wherein the chain extender is ethylene glycol or 1,4-butane diol.

41. A polymer of claim 37 wherein the chain extender is ethylene glycol or 1,4-butane diol.

42. A polymer of claim 38 wherein the chain extender is ethylene glycol or 1,4-butane diol.

43. A polymer of claim 39 wherein the chain extender is ethylene glycol or 1,4-butane diol.

44. A polymer of claim 36 in which said mole ratio is within the range of from about 1/4/3 to about 1/6/5.

45. A polymer of claim 41 wherein said mole ratio is about 1/5/4.

46. A polymer of claim 42 wherein said mole ratio is about 1/5/4.

47. A polymer of claim 43 wherein said mole ratio is about 1/5/4.

48. A polymer of claim 37 wherein Q is $CH_2$ and a, b, c and d are such that said polyglycol has a molecular weight of from about 1900 to about 2100 and the weight ratio of —O—$CH_2$—$CH_2$— to —O—$CHCH_3$—$CH_2$— units therein is not greater than about 20/80.

49. A polymer of claim 48 in which said weight ratio is about 12/88.

50. A polymer of claim 47 wherein Q is $CH_2$ and a, b, c and d are such that said polyglycol has a molecular weight within the range of from about 1900 to about 2100 and the weight ratio of $-O-CH_2-CH_2-$ to $-O-CHCH_3-CH_2-$ units therein is about 12/88.

51. A polymer of claim 36 having an average molecular weight of from about 130,000 to 180,000.

52. A polymer of claim 38 having an average molecular weight of from about 130,000 to about 180,000.

53. A polymer of claim 40 having an average molecular weight of from about 130,000 to about 180,000.

54. A polymer of claim 42 having an average molecular weight of from about 130,000 to about 180,000.

55. A polymer of claim 44 having an average molecular weight of from about 130,000 to about 180,000.

56. A polymer of claim 46 having an average molecular weight of from about 130,000 to about 180,000.

57. A polymer of claim 47 having an average molecular weight of from about 130,000 to about 180,000.

58. A polymer of claim 48 having an average molecular weight of from about 130,000 to about 180,000.

59. A polymer of claim 49 having an average molecular weight of from about 145,000 to about 155,000.

60. A polymer of claim 50 having an average molecular weight of from about 145,000 to about 155,000.

* * * * *

UNITED STATES PATENT AND TRADEMARK OFFICE
CERTIFICATE OF CORRECTION

PATENT NO. : 4,621,113

DATED : November 4, 1986

INVENTOR(S) : Guy R. Collins

It is certified that error appears in the above-identified patent and that said Letters Patent is hereby corrected as shown below:

Column 2, line 11, "+590" should read -- '590 --.

Column 3, line 22, "compositon" should read -- composition --.

Column 6, line 52, "polyproplyene" should read -- polypropylene --.

Column 6, line 64, "bromocyloaliphatic" should read -- bromocycloaliphatic --. (our error)

Column 7, line 46, "di(isocyantoethyl)carbonate," should read -- di(isocyanatoethyl)carbonate --.

Column 7, line 49, "bis- 4(2-isocyantoisopropyl)phenyl)-carbonate" should read -- bis 4(2-isocyanatoisopropyl)phenyl)carbonate --.

Column 8, line 52, "group" should read -- groups --.

Column 12, line 29, "termperature" should read --temperature --.

UNITED STATES PATENT AND TRADEMARK OFFICE
CERTIFICATE OF CORRECTION

PATENT NO.   :   4,621,113

DATED        :   November 4, 1986

INVENTOR(S)  :   Guy R. Collins

It is certified that error appears in the above-identified patent and that said Letters Patent is hereby corrected as shown below:

Column 12, line 44, "prepard" should read -- prepared --.

Column 13, line 60, "isocyante" should read -- isocyanate --.

Column 14, line 28, "1,4-butene" should read -- 1,4-butane --.

Column 14, line 33, "octate" should read -- octoate --.

Column 23, table 12-continued, under the heading RATIO the figure "1/5.15.4" should read -- 1/5.15/4 --.

Column 23, line 27, "DCHDI" should read -- DCHMDI --.

Column 23, table 14 the heading "Glycol$^2$DCHMDI$^3$/BD" should read -- Glycol$^2$/DCHMDI$^3$/BD --.

Column 24, line 18, "DCHDI" should read -- DCHMDI --.

Column 27, line 43, "isocyanateterminated" should read -- isocyanate-terminated --.

UNITED STATES PATENT AND TRADEMARK OFFICE
CERTIFICATE OF CORRECTION

PATENT NO. : 4,621,113

DATED : November 4, 1986

INVENTOR(S) : Guy R. Collins

It is certified that error appears in the above-identified patent and that said Letters Patent is hereby corrected as shown below:

Column 27, line 67, "$C_1\_10$" should read -- $C_{1-10}$ --.

Column 28, line 68, "ethyI" should read -- ethyl --.

Column 29, line 61, "methylolterminated" should read --methylol-terminated --.

Signed and Sealed this

Eleventh Day of August, 1987

Attest:

DONALD J. QUIGG

Attesting Officer

Commissioner of Patents and Trademarks